Patented Apr. 18, 1939

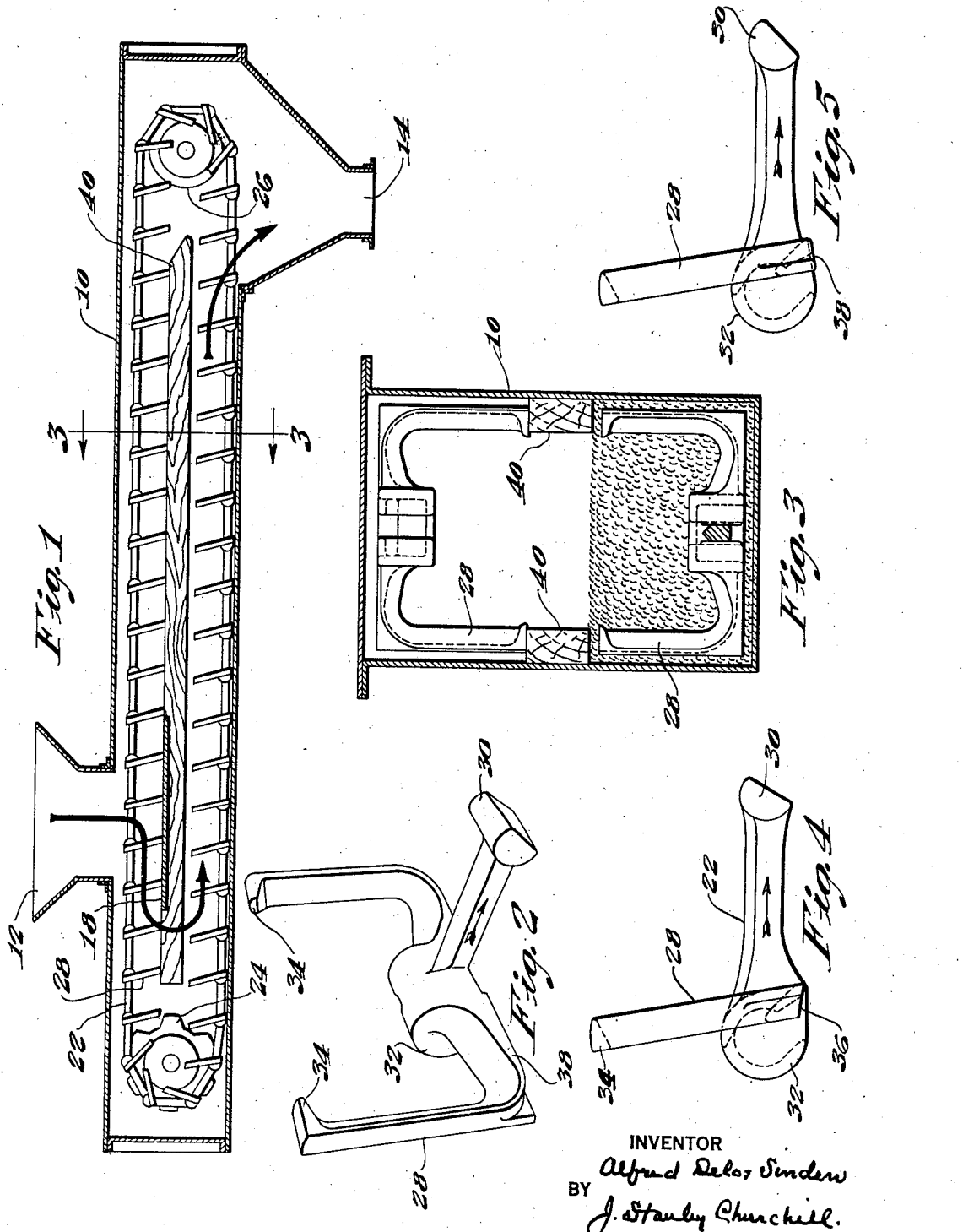

2,154,707

UNITED STATES PATENT OFFICE 2,154,707

CONVEYER

Alfred De Los Sinden, Aurora, Ill., assignor to Redler Conveyor Company, Quincy, Mass., a corporation of Massachusetts Application May 9, 1936, Serial No. 78,862

4 Claims. (Cl. 198—168)

This invention relates to a conveyer for conveying flowable solid material.

The invention has for an object to provide a novel and improved conveyer of the character in which a conveying element is arranged to be drawn through a casing or conduit to effect the conveyance of the material therethrough, and in which the conveying element is provided with a plurality of spaced flight members arranged to extend transversely of the direction of movement of the conveying element through the conduit.

In the commercial operation of a conveyer of the type employing a conveying element having transversely extended flight members, a tendency exists for the flight members to be forced into contact with one of the walls of the casing or conduit through which the conveyer is drawn. Because of the fact that the pull or tension on the conveyer member is offset with respect to the portions of the flight members which are thus brought into contact with the wall of the casing or trough, as the conveyer member is drawn through the casing or conduit, the flight members contact the wall of the casing intermittently, and as a result the flight members appear to bump along the wall of the casing, producing excessive vibration and noise. Also, prior to the present invention the upright arms of the flight members of horizontally disposed conveyers of the type described were disposed at right angles to the horizontal run of the conveying element, and in this condition when the conveying element reached the upper run of the conveyer in an inverted position and came in contact with the guide runners, the friction of the contacting parts of the flights against the runners would cause the flights to jump or vibrate intermittently, the action being analogous to the vibration set up by rubbing a finger across a window pane. This action also caused the flights to fluctuate or jump from one side wall of the casing to the other. Inasmuch as in practice commercial conveyers of the character specified, including the conduits, have been usually constructed of metal, the vibration and accompanying noise thus produced has been very objectionable. In addition, because of the intermittent irregular contact of the flights with the wall of the casing or conduit, irregular strains have been placed upon the different portions of the conveying element and excessive wear has resulted both upon the contacting portions of the flights themselves and upon the wall of the conduit or other member with which the flights engage.

In accordance with the present invention, these objectionable features are eliminated by so mounting the flight members that the points of connection of the flights with the conveyer element are disposed, with respect to the travel of the conveyer element, ahead of the point at which the flight contacts with the wall of the casing or conduit, so that as the conveying element is drawn through the casing or conduit and the flight contacts with the wall thereof, the flight is dragged smoothly through the conduit without the production of vibration, noise, and the other objectionable features above referred to. Also, the vibration caused by the contacting parts of the flights with the guide runners in the upper run is eliminated by disposing the flight member so that it extends rearwardly at a slight angle from the vertical, with respect to the travel of the conveyer element.

In the drawing illustrating the preferred embodiment of the invention, Fig. 1 is a longitudinal sectional view of a conveyer for transporting flowable solid material and embodying the present invention; Fig. 2 is a perspective view illustrating one of the flights making up the conveyer element used in the conveyer shown in Fig. 1; Fig. 3 is a cross-sectional detail on the line 3—3 of Fig. 1; and Figs. 4 and 5 are details in side elevation illustrating modified forms of the individual flights used in producing the conveying element.

Referring now to the drawing, the different features of the invention have for purposes of illustration been shown as embodied in a conveyer of the general type illustrated in the Redler Reissue Patent No. 18,445, of April 26, 1932, and in which 10 represents the casing or conduit which is provided with an inlet 12 and an outlet 14. The flowable solid material is introduced into the conduit through the inlet 12, and in the conventional form of conveyer illustrated in Fig. 1, the flowable solid material is designed to be conveyed to the left, Fig. 1, over a deflecting or supporting plate 18 by the upper run of an endless conveyer member 22, which is arranged to run around sprockets 24, 26, one of which 24 may be driven from any convenient source of power, not shown. The material is then permitted to fall by gravity on to the bottom wall of the casing 10 where it is conveyed to the outlet 14 by the lower run of the conveyer.

The conveyer member 22 is provided with a plurality of flight members, indicated generally at 28, which are arranged to extend transversely of and rearwardly inclined with respect to the general direction of movement of the conveyer member in order to effect the conveyance of the material through the casing or conduit. In one form of the invention the flight members may comprise open flights by which the flowable solid material may be conveyed in a continuous stream through the casing, and in another form of the invention the individual flights may take the form of solid flights, and in any event the present conveying element is characterized by the fact that the individual flights are extended transversely of the casing through which the conveyer is drawn or transversely of the direction of movement of the conveyer member and further by the fact that the extended portions of the flight are rearwardly inclined with relation to the line of conveyer movement.

As illustrated in Fig. 1, the flight members are arranged in a nearly upright position in the lower run of the conveyer while in the upper run of the conveyer the individual flight members are arranged in an inverted position, and in practice during the return or upper run of the conveyer the individual flight members may bear upon supporting side pieces 40, as best shown in Fig. 3.

In accordance with the present invention the individual flight members 28 are mounted upon the conveying element or tension member 22 so that those parts of the flight, irrespective of its form, which during the operation of the conveyer may be forced into contact with the adjacent wall or interior surface of the casing, are disposed in the rear of the connection of one flight with the preceding flight. In the preferred form of the conveyer, the transversely extended flight members 28 are arranged to extend rearwardly with respect to the direction of travel at a slight angle from the vertical to insure smooth and vibrationless operation.

In the illustrated form of conveyer in which open flights are utilized to convey the material through the conduit, both the flight 28 and tension link 22 are cast integral and the conveying members are assembled by hooking the connecting lug 30 into the barrel 32 of the preceding flight. The upright arms 28 of each U-shaped flight, see Figs. 2 and 3, including the upper ends 34 of the arms are disposed in the rear of the connecting lug 30 and in angular relationship to the tension link 22. When the conveying element 22 reaches the upper run, the flights 28 are disposed in an inverted position, and the ends 34 of the arms are in contact with the guide runners 40. In this position the angular relationship of the flights 28 with respect to the tension link 22 insures smooth running and eliminates the vibration and accompanying noise inherent in the prior construction with the arms at right angles to the tension link. It will also be noted that the ends 34 of the arms are slightly rounded to further assist in producing a smooth and quiet running conveying element.

Referring now to Figs. 4 and 5, modified forms of conveying elements are illustrated, to provide for different conditions of conveying or for different types of materials. In Fig. 4 is shown the flight which is known commercially as the "digging" type, and is characterized by having the bottom surface 36 of the flight 28 and the cross bars 38, formed at an acute angle with the forward edge of the arms 28, said bottom surface sloping upwardly and rearwardly with respect to the horizontal run of the conveying element, so that in operation the flight will have a tendency to "dig" into the material toward the bottom of the mass. In Fig. 5 is shown the flight known commercially as the "floating" type and is characterized by having the bottom surface 38 and the bottom of the cross bars formed at a right angle with the forward edge of the arms 28, said bottom surface sloping downwardly and rearwardly with respect to the horizontal run of the conveying element, and has the effect of "floating" the conveying element in the material being conveyed.

From the description thus far it will be observed that the present construction of conveying element is particularly conducive to producing a substantially noiseless and vibrationless conveyer of the character specified and thereby contributing to effect a more quiet, efficient and more durable conveyer of this type.

While the preferred embodiment of the invention has been herein illustrated and described, it will be understood that the invention may be embodied in other forms within the scope of the following claims.

Having thus described the invention, what is claimed is:—

1. In a conveyer of the character described, in combination, an endless conveyer having upper and lower runs and comprising a plurality of connected spaced flights, a casing through which the upper and lower runs of said endless conveyer travel, said casing being provided with supporting means upon which the inverted flights of said upper run are supported, said flights being disposed rearwardly at an angle slightly more than ninety degrees from the direction of travel of the conveyer whereby to reduce to a minimum vibration upon the contacting ends of the flights with said supporting means.

2. In a conveyer of the character described, in combination, an endless conveyer having upper and lower runs and comprising a plurality of connected spaced open flights, a casing through which the upper and lower runs of said endless conveyer travel, said casing being provided with supporting means upon which the inverted flights of said upper run are supported, said flights being disposed rearwardly at an angle slightly more than ninety degrees from the direction of travel of the conveyer whereby to reduce to a minimum vibration upon the contacting ends of the flights with said supporting means.

3. In a conveyer of the character described, in combination, an endless conveyer having upper and lower runs and comprising a plurality of connected spaced U-shaped flights, a casing through which the upper and lower runs of said endless conveyer travel, said casing being provided with supporting means upon which the inverted flights of said upper run are supported, said flights being so disposed that the upper ends thereof are disposed in advance of the lower portion thereof whereby to reduce to a minimum vibration upon the contacting ends of the flights with said supporting means.

4. In a conveyer of the character described in combination, an endless conveyer adapted to be moved through a working run and a return run, said conveyer comprising a plurality of open flights including a cross member extending transversely of the direction of movement of said flights, arms projecting from said cross member and means for connecting said flights, means engaging said arms for supporting said flights during movement thereof through said return run, the portions of said flights remote from said connecting means being inclined rearwardly, with respect to said direction of movement, from said connecting means to reduce vibration to a minimum.

ALFRED DE LOS SINDEN.